(12) United States Patent
Park et al.

(10) Patent No.: US 8,605,694 B2
(45) Date of Patent: Dec. 10, 2013

(54) METHOD FOR CLUSTER BASED DATA TRANSMISSION IN WIRELESS SENSOR NETWORKS

(75) Inventors: Sang-Joon Park, Daejeon (KR);
Young-Bag Moon, Goyang-si (KR);
Young-Bae Ko, Suwon-si (KR);
Keun-Woo Lim, Suwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 442 days.

(21) Appl. No.: 12/908,353

(22) Filed: Oct. 20, 2010

(65) Prior Publication Data
US 2011/0130162 A1 Jun. 2, 2011

(30) Foreign Application Priority Data
Nov. 30, 2009 (KR) .......................... 10-2009-0117321

(51) Int. Cl.
*H04W 4/00* (2009.01)
*H04B 7/00* (2006.01)

(52) U.S. Cl.
USPC ............................. 370/338; 370/330; 455/507

(58) Field of Classification Search
USPC ............. 455/426.1, 426.2; 370/338, 227, 254
See application file for complete search history.

(56) References Cited

U.S. PATENT DOCUMENTS

| 7,035,240 | B1 * | 4/2006 | Balakrishnan et al. ....... 370/338 |
| 7,171,476 | B2 * | 1/2007 | Maeda et al. ................. 709/227 |
| 7,830,838 | B2 * | 11/2010 | Kohvakka et al. ............ 370/330 |
| 7,860,968 | B2 * | 12/2010 | Bornhoevd et al. .......... 709/224 |
| 8,055,740 | B2 * | 11/2011 | Kim et al. ..................... 709/221 |
| 8,131,838 | B2 * | 3/2012 | Bornhoevd et al. .......... 709/224 |
| 2003/0012168 | A1 * | 1/2003 | Elson et al. .................... 370/338 |
| 2003/0117966 | A1 * | 6/2003 | Chen ............................ 370/255 |

(Continued)

FOREIGN PATENT DOCUMENTS

| KR | 10-0856882 | 8/2008 |
| KR | 10-2009-0041769 | 4/2009 |
| KR | 1020090036178 | 4/2009 |

OTHER PUBLICATIONS

Jung, Woo-Sung et al., "A Hybrid Approach for Clustering-based Data Aggregation in Wireless Sensor Networks," ICDS '09 Third International Conference on Digital Society, pp. 112-117 (2009).

(Continued)

*Primary Examiner* — Tilahun B Gesesse
(74) *Attorney, Agent, or Firm* — Nelson Mullins Riley & Scarborough LLP; Anthony A. Laurentano, Esq.; David M. Noonan, Esq.

(57) ABSTRACT

The present invention relates to a method for cluster based data in wireless sensor networks. The method includes: selecting any one of border nodes positioned at the edge of a cluster as a temporary cluster head as a temporary cluster head when a target is sensed in the cluster; bugging data of the temporary cluster head by border nodes in other adjacent cluster which do not sense the target to temporarily change the border node selected as the temporary cluster head to a cluster head of each of the border nodes; when the target is sensed by at least one of the border nodes, collecting data from each of the border nodes by the temporary cluster head to transferring the collected data to an actual cluster head of the temporary cluster head; and aggregating the collected data by actual cluster head of the temporary cluster head.

9 Claims, 5 Drawing Sheets

(56) References Cited

U.S. PATENT DOCUMENTS

| | | | |
|---|---|---|---|
| 2007/0223497 A1* | 9/2007 | Elson et al. | 370/400 |
| 2008/0253327 A1* | 10/2008 | Kohvakka et al. | 370/330 |
| 2009/0059827 A1* | 3/2009 | Liu et al. | 370/311 |
| 2009/0092112 A1* | 4/2009 | Kim et al. | 370/338 |
| 2009/0207769 A1* | 8/2009 | Park et al. | 370/311 |
| 2010/0074133 A1* | 3/2010 | Kim et al. | 370/252 |
| 2011/0130162 A1* | 6/2011 | Park et al. | 455/507 |
| 2012/0257530 A1* | 10/2012 | Bijwaard et al. | 370/252 |

OTHER PUBLICATIONS

Zhang, Yu et al., "Energy and Data Aware Clustering for Data Aggregation in Wireless Sensor Networks," IEEE International Conference on Mobile Adhoc and Sensor Systems, pp. 1-6 (2007).

* cited by examiner

METHOD FOR CLUSTER BASED DATA TRANSMISSION IN WIRELESS SENSOR NETWORKS

CROSS REFERENCE TO RELATED APPLICATIONS

This application claims priority to Korean Patent Application No. 10-2009-0117321 filed on Nov. 30, 2009, the entire contents of which are herein incorporated by reference.

BACKGROUND OF THE INVENTION

1. Field of the Invention

The present invention relates to a method for cluster based data in wireless sensor networks, and more particularly, to a method for cluster based data in wireless sensor networks that can improve transmission efficiency of data by concentrating data transmission on a predetermined cluster head to aggregate data.

2. Description of the Related Art

A wireless sensor network is a technology that detects a behavior and an environment of a target by utilizing sensors disposed in a predetermined region, converting the detected information into data, and wirelessly transmitting the data to a sink node collecting data. Various sensor nodes are disposed in a dense region in order to improve the accuracy of data in the wireless sensor network, in particular, an efficient target tracking, monitoring, and surveillance application field.

As a result, many sensor nodes participate in target detection and data transmission even in the case of detecting a single target and as a result, a large amount of duplicated data is generated. When all the data are transmitted to the sink node collecting data without special processing, collision and excessive transmission of data occurs in a network.

This causes unnecessary energy consumption of a sensor network, and decrease the accuracy and reliability of data.

In order to solve the problems, research of a network structure and a data aggregating technology for efficient target tracking is being conducted.

In particular, since the data aggregating technology reduces unnecessary transmissions by transmitting various duplicated data to a data aggregating node in the middle of the network and transmits only aggregated data to the sink node, the data aggregating technology can reduce energy consumption and data transmission delay, and increase the accuracy of data.

A representative example of the data aggregating technologies in a hierarchical network structure may include a static clustering based data aggregating technology.

The static clustering based data aggregating technology transmits data to a cluster head on the basis of a static cluster initially generated in the network. Nodes that detect the target transmit all the detected data to their own cluster heads and the cluster heads receiving data aggregate data and transmit only the aggregated data to the data collection node.

Since the static clustering based data aggregating technology aggregates data by using a cluster constructed before detecting the target, a delay time for additionally constructing the cluster is not generated and as a result, data can be transmitted at comparatively high speed. Further, since a sudden change of the cluster does not frequently occur, the network can be stably maintained.

On the contrary, when various clusters detect one target, each node transmits data to each cluster head and as a result, data is not perfectly aggregated.

SUMMARY OF THE INVENTION

There is an object of the present invention to develop a node cooperation technique capable of analyzing problems of the existing techniques in wireless sensor networks and being easily applied to the existing research and invention in order to improve data transmission and aggregation efficiency.

There is provided a node cooperation technology of analyzing the existing data aggregation problem in the wireless sensor networks constituted by clusters and solving it. Further, there is provided a method that can solve energy consumption problem which is a big issue in the sensor networks, improve network data aggregation efficiency, and improve the transmission speed and reliability of data.

According to another embodiment of the present invention, there is provided a method for cluster based data transmission in wireless sensor networks that includes: selecting any one of border nodes positioned at the edge of a cluster as a temporary cluster head as a temporary cluster head when a target is sensed in the cluster; bugging data of the temporary cluster head by border nodes in other adjacent cluster which do not sense the target to temporarily change the border node selected as the temporary cluster head to a cluster head of each of the border nodes; when the target is sensed by at least one of the border nodes, collecting data from each of the border nodes by the temporary cluster head to transferring the collected data to an actual cluster head of the temporary cluster head; and aggregating the collected data by actual cluster head of the temporary cluster head.

The method further includes forming a temporary cluster including the border nodes and the temporary cluster head.

The method further includes, after the selecting, broadcasting data from the border node selected as the temporary cluster to its own cluster head.

The border nodes in other adjacent clusters are positioned within a data transmission range of the border node selected as the temporary cluster head.

The method further includes canceling the temporary cluster head for a border node which does not sense the target for a predetermined time or more among the border nodes and changing the temporary cluster head to an actual cluster head of the corresponding border node.

When each of the border nodes transmits data to the temporary cluster head, a header of the data includes at least one of a node ID and cluster head information of the corresponding border node.

The aggregating the data aggregates data sensed by border nodes in other clusters with respect to the same target.

According to yet another embodiment of the present invention, there is provided a method for cluster based data transmission in wireless sensor networks that includes: selecting any one of the border nodes positioned at the edge of a cluster to a temporary cluster head, when a target is sensed in the cluster; bugging data of the temporary cluster head by border nodes in other adjacent clusters to forming a temporary cluster including the border nodes and the temporary cluster head; reselecting a border node having the highest priority among the border nodes as the temporary cluster head by comparing priorities of the border nodes in the temporary cluster; collecting data from each of the border nodes to transferring the collected data to cluster head of the temporary cluster head; and aggregating the collected data by the cluster head of the temporary cluster head.

The method further includes, before the selecting, granting the priority to the cluster heads in each of clusters.

At the granting the priority to the cluster head in each of clusters, the priority is granted on the basis of at least one of a distance between the cluster head and the nodes collecting data, remaining energy of the cluster head, and transmission capability of the cluster head.

According to the exemplary embodiments of the present invention, it is possible to improve the efficiency of data aggregation by concentrating data transmission on a predetermined cluster head and to improve energy efficiency by reconfiguring a temporary cluster only bugging data without transmitting an additional control packet.

Further, the data aggregation efficiency is improved to prevent data from colliding with each other and the reliability and accuracy of data are improved due to a decrease in data collision and delay time.

DETAILED DESCRIPTION OF THE PREFERRED EMBODIMENTS

A method for cluster based data transmission in wireless sensor networks and a method thereof according to an exemplary embodiment of the present invention provide a data aggregating technology using a node cooperation technique. First, the structure of the wireless sensor networks for efficiently operating the present invention will be described.

An algorithm selecting a cluster head is required with energy efficiency in order to generate a static cluster in the wireless sensor network. Two methods are proposed in order to select the cluster head in the network in the existing research and invention. An algorithm proposed in the present invention may use both methods according to an application to be applied or circumstances.

The first cluster head selecting method is a technique periodically converting the cluster head in a single sensor network. In the single sensor network, sensors of the same kind are disposed in the network.

The second cluster head selecting method selects the cluster head primarily from a node having higher performance than a general sensor in a complex sensor network. In the complex sensor network, sensor nodes are randomly disposed, but backbone network nodes to be selected as the cluster head are evenly disposed to include the entire network.

In general, the sensor nodes use a low-efficiency protocol such as IEEE 802.15.4 or S-MAC and the backbone network node includes a backbone network, a sink node, a low-efficiency protocol capable of receiving data of the general sensor node in addition to a protocol such as high-efficiency and high-speed 802.11.

When the static cluster is generated in the network by using the cluster head selecting technique, data can be aggregated by using the cluster.

In this case, a node cooperation technique is used in order to improve the performance of the network as well as improving data aggregation efficiency.

The following matters are assumed in order to efficiently operate the present invention.

First, sensor nodes which are positioned at the edge of the cluster and form a border with other clusters are referred to as border nodes (BN).

Further, a transmission range (TR) in which the sensor node can transmit data is twice or larger than a sensing range (SR) in which the sensor node can sense a target. In this case, the sensor nodes that sense the target are positioned within an intercommunicable range.

Further, when each sensor senses the target and transmits data, a data packet header includes information on a node ID and a cluster head of each sensor.

Hereinafter, embodiments of the present invention will be described with reference to the accompanying drawings.

Figure 1:
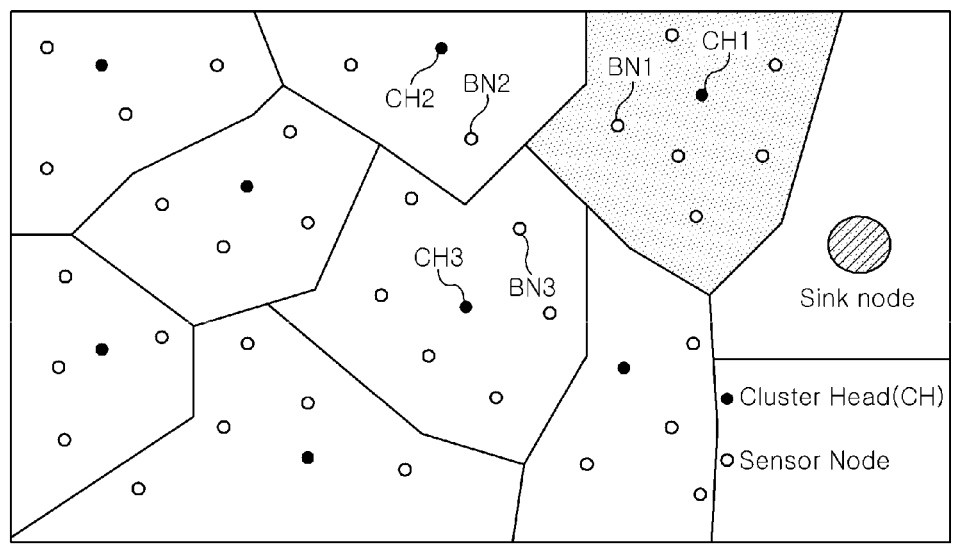
FIG. 1 is a diagram referenced for describing a configuration of a sensor network according to an embodiment of the present invention.

FIG. 1 is a diagram showing the structure of a sensor network according to an embodiment of the present invention.

In the embodiment of the present invention, when a sensor node that is positioned at the edge of a cluster senses a target and transmits data, border nodes in other clusters positioned adjacent to the sensor node bug data transmission.

In this case, any one of a plurality of border nodes is selected as a temporary cluster head.

As the temporary cluster head may be selected as a border node having the highest priority among priorities granted to cluster heads in clusters to which the border nodes belong among border nodes included in a temporary cluster.

When a border node having a priority higher than the border node selected as the temporary cluster head is provided, the border node having the cluster head having the higher priority may be reselected as the temporary cluster head while bugging data.

The temporary cluster head selects that the corresponding cluster head itself is selected as the temporary cluster to other border nodes and each of the other border nodes temporarily sets the temporary cluster head as its own cluster head.

Each of the border nodes is positioned within a data transmission range of the temporary cluster head.

The temporary cluster head forms the temporary cluster together with the border nodes. When the target is sensed by at least one of the border nodes in the temporary cluster, the temporary cluster head collects data from the border nodes and transfers the data to its own cluster head of the temporary cluster head.

Each of the border nodes transmits data to the cluster head by including at least one of a node ID and cluster head information of the corresponding border node in a packet head.

In this case, the cluster head aggregates data collected from the temporary cluster head. Of course, the cluster head of the temporary cluster head aggregates data collected from the temporary cluster head with respect to the same target.

Meanwhile, when each border node senses no target in the temporary cluster for a predetermined time or more, each border node cancels the temporary cluster head and converts the cluster head of the corresponding border node to its actual cluster head.

Figure 2:
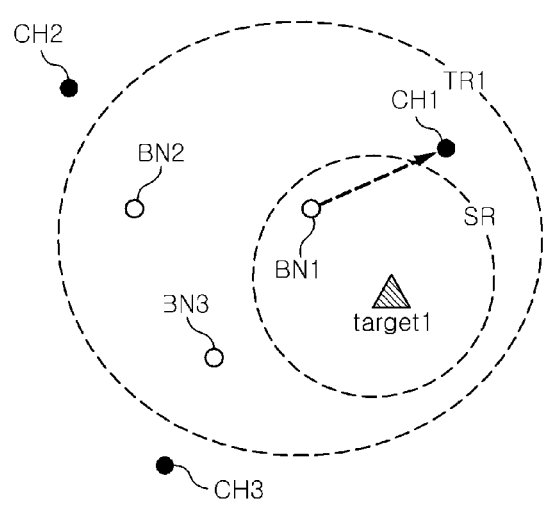
FIGS. 2 to 4 are exemplary diagrams referenced for describing data transmission operations of border nodes according to an embodiment of the present invention.
Figure 3:
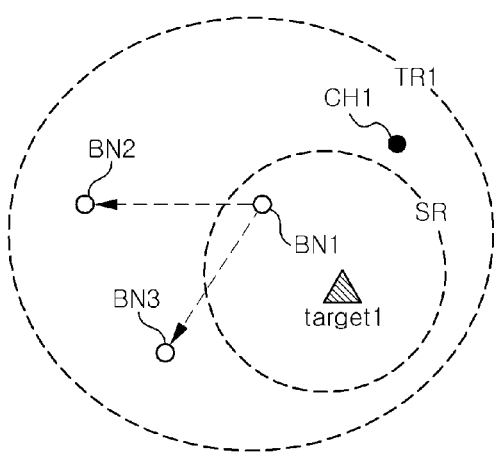
Figure 4:
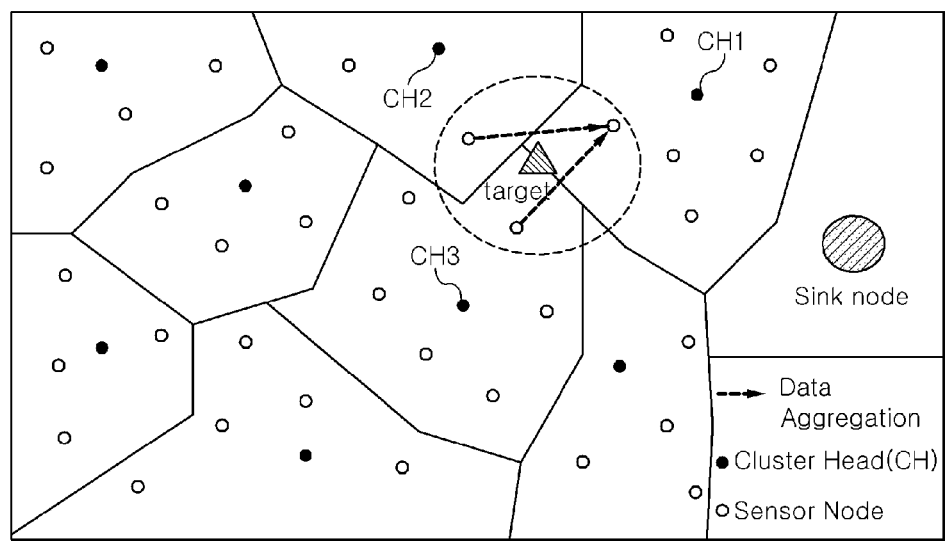

FIGS. 2 to 4 are exemplary diagrams referenced for describing data transmission operations of border nodes shown in FIG. 1 according to an embodiment of the present invention.

As shown in FIG. 2, a border node BN1 that first senses the target and is positioned at the edge of the cluster selects itself as the temporary cluster had and broadcasts data to its cluster head CH1 in a unicast method.

Border nodes BN2 and BN3 that still do not sense the target and are positioned at edges of other clusters are positioned within a transmission range of the border node BN1 selected as the temporary cluster head as shown in FIG. 3.

Therefore, the border nodes BN2 and BN3 bug data broadcasted by the border node BN1 while the border node BN1 broadcasts data through the cluster head CH1.

The border nodes BN2 and BN3 that bug data temporarily convert their own cluster heads into the border head BN1 which is the temporary cluster head.

As shown in FIG. 4, when the border nodes BN2 and BN3 sense the target, the border nodes BN2 and BN3 transmit data to the border node BN1 selected as the temporary cluster head, not their own actual cluster heads.

As a result, the border node BN1 that receive data forwards data collected by itself and data collected from the border nodes BN2 and BN3 to its own cluster head to aggregate data in only one cluster head.

Herein, when the border nodes BN2 and BN3 does not sense the target any longer, the border nodes BN2 and BN3 modify their own cluster heads as their basic cluster heads.

Figure 5:
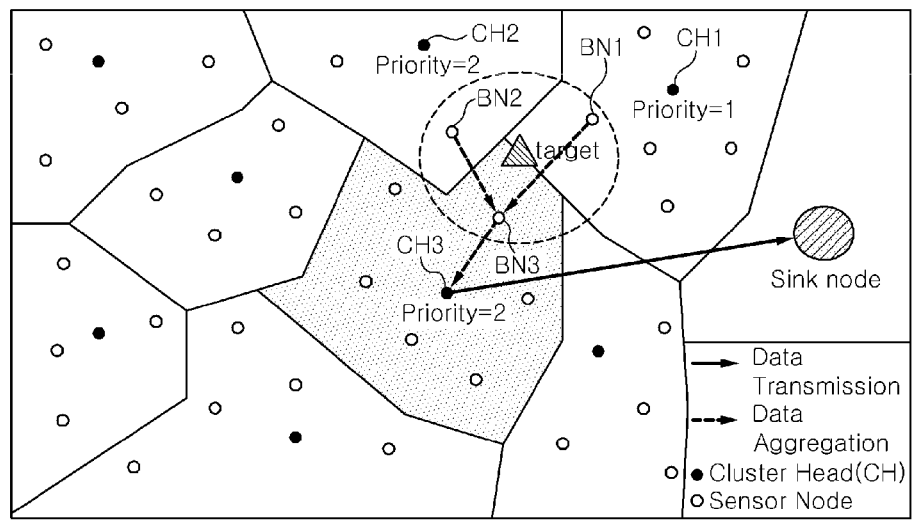
FIGS. 5 and 6 are exemplary diagrams referenced for describing an operation selecting a temporary cluster head in accordance to a priority granted to cluster heads of border nodes according to an embodiment of the present invention.
Figure 6:
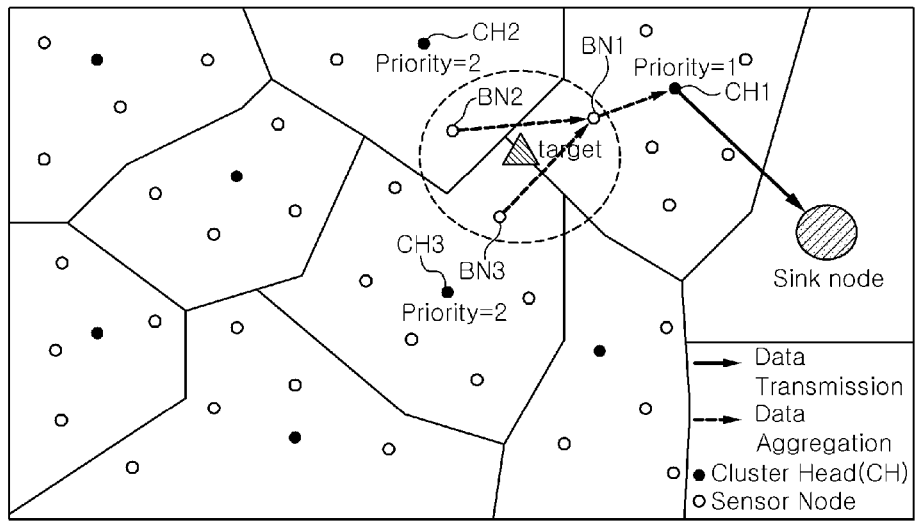

Meanwhile, FIGS. 5 and 6 are exemplary diagrams referenced for describing a data transmission operation using a border node having a high priority in a sensor network shown in FIG. 1.

In the embodiment of the present invention, a priority is granted to a cluster head of each cluster in order to efficiently transmit data.

First, when the cluster head is initially selected in the network, it is assumed that the border node BN1, BN2, and BN3 can recognize priorities granted to cluster heads of other border nodes.

When a cluster head distant from a data collection node aggregates data, the aggregated data should move a long distance in order to reach the data collection node. Therefore, the cluster heads are granted with priorities on the basis of various parameter values such as a distance from the data collection node, remaining energy of the cluster head, transmission capability of the cluster head, etc.

After the priorities are granted to the cluster heads of the clusters, the border node BN3 first senses the target as shown in FIG. 5. In this case, the border node BN3 is selected as the temporary cluster head. Further, the border node BN3 sets other border nodes BN1 and BN2 as its own temporary cluster.

Thereafter, when other border nodes BN1 and BN2 transmit data to the border node BN3, the border nodes BN2 and BN3 recognize that the cluster head of the other border BN1 has the higher priority and reselect the border node BN1 as the temporary cluster head.

Therefore, as shown in FIG. 6, the border nodes BN2 and BN3 transmits data to the border node BN1 selected as a new temporary cluster head, not the border node BN3 selected as the initial temporary cluster head.

The border node BN1 that receive data forwards data collected by itself and data collected from the border nodes BN2 and BN3 to its own cluster head to aggregate data in only one cluster head.

The operation of the present invention configured as described above will now be described.

Figure 7:
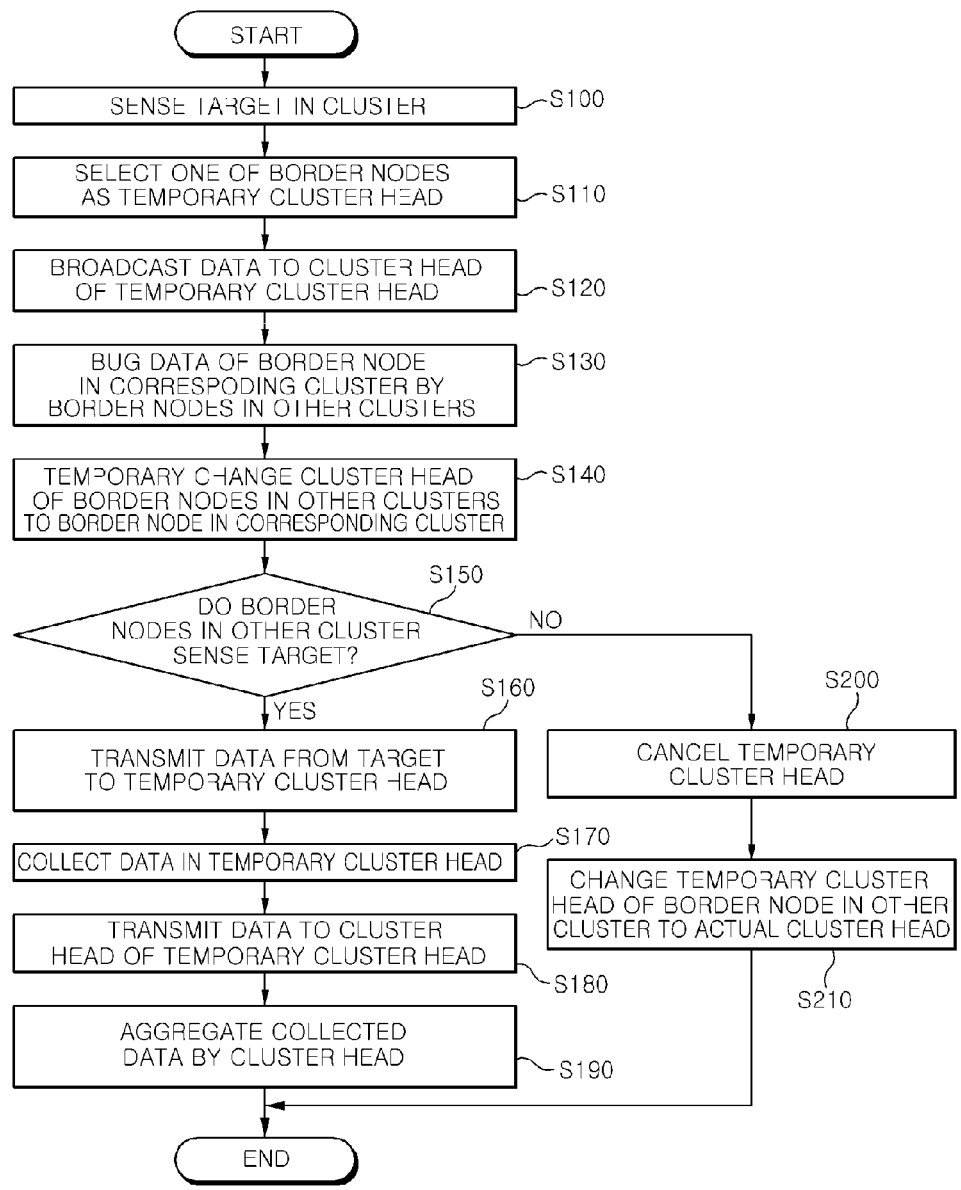
FIGS. 7 and 8 are flowcharts showing an operational flow for a method for cluster based data transmission in wireless sensor networks according to an embodiment of the present invention.

FIG. 7 is flowcharts showing an operational flow for a method for cluster based data transmission in wireless sensor networks according to an embodiment of the present invention.

As shown in FIG. 7, when a target is sensed by a border that is positioned at the edge of a cluster (S100), one of adjacent border nodes is selected as a temporary cluster head (S110). Preferably, a border node that first senses the target is selected as the temporary cluster head.

The temporary cluster head broadcasts its own cluster data (S120). In this case, border nodes in other clusters bug data which the temporary cluster head broadcasts to its own cluster head (S130).

The border nodes in other clusters convert their own cluster heads into the temporary cluster head (S140).

If the target is sensed by the border nodes in other clusters (S150), each of the border nodes collects data sensed from the target and transmits the collected data to the temporary cluster head (S160).

The temporary cluster head collects data transmitted from each border node (S170) and transfers the collected data to its own cluster head (S180).

The cluster head of the temporary cluster head aggregated the collected data (S190).

Meanwhile, when a border node that does not sense the target is provided among the border nodes in other clusters (S150), the corresponding border node cancels the temporary cluster head (S200) and changes the temporary cluster head to a basic cluster head, that is, its own cluster head (S210).

Figure 8:
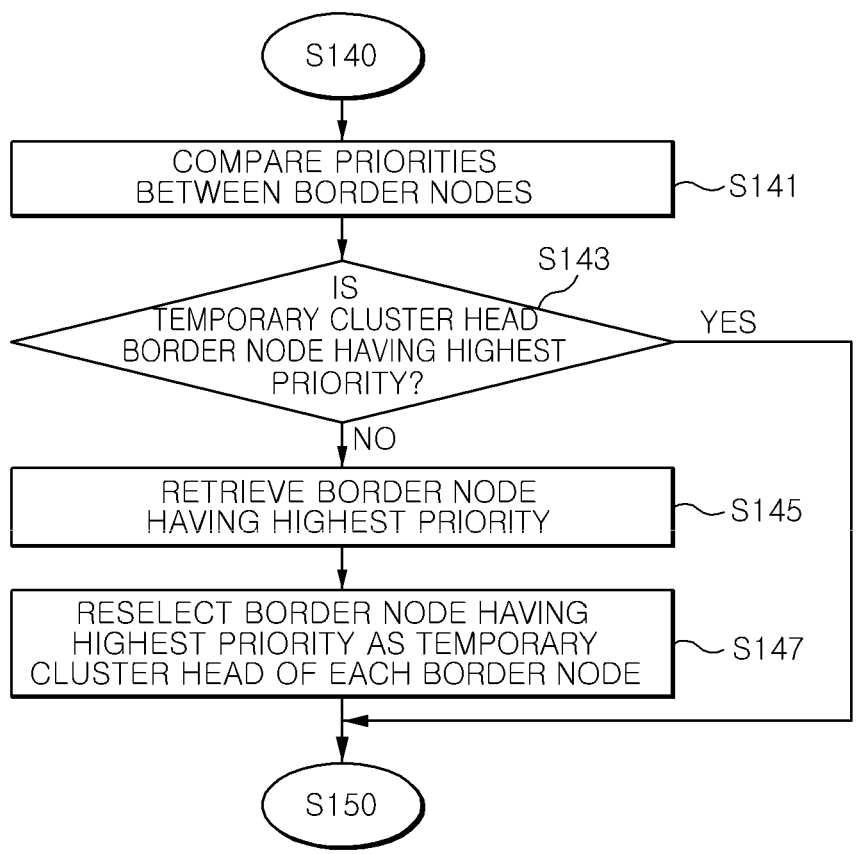

FIG. 8 shows an operation flow partitioning step 'S140' of FIG. 7.

As shown in FIG. 8, each border node bugs data while the border nodes in other clusters change their own cluster heads into the temporary cluster head at step 'S140' of FIG. 7 and they compare priorities granted to their own cluster heads with each other (S141).

If the cluster head of the border node selected as the temporary cluster head has the highest priority (S143), step 'S150' of FIG. 7 is performed while designating the temporary cluster head.

On the contrary, when the cluster head of the border node selected as the temporary cluster head has not the highest priority (S143), a border node having the highest priority is retrieved (S145) to reselect the corresponding border node as the temporary cluster head of each border node (S147). Thereafter, step 'S150' of FIG. 7 is performed.

As described above, a method for cluster based data in wireless sensor networks and a method thereof are not limited to the configuration and method of the embodiments described as above, but the embodiments may be configured by selectively combining all the embodiments or some of the embodiments so that various modifications can be made.

What is claimed is:

1. A method for cluster based data transmission in wireless sensor networks, comprising:
    selecting one of a plurality of border nodes positioned at the edge of a cluster as a temporary cluster head based on sensing a target in the cluster; broadcasting data from the one of the plurality of border nodes selected as the temporary cluster head to its own cluster head based at least in part on the selecting
    bugging data of the temporary cluster head by one or more of the plurality of border nodes in other adjacent clusters to temporarily change the one of the plurality of border nodes selected as the temporary cluster head to a cluster head of each of the one or more border nodes;
    collecting data from each of the one or more border nodes by the temporary cluster head to transfer the collected data to an actual cluster head of the temporary cluster head; and aggregating the collected data by actual cluster head of the temporary cluster head.

2. The method for cluster based data transmission in wireless sensor networks according to claim 1, further comprising forming a temporary cluster including the plurality of border nodes and the temporary cluster head.

3. The method for cluster based data transmission in wireless sensor networks according to claim 1, wherein the one or more border nodes in other adjacent clusters are positioned within a data transmission range of the one of the plurality of border nodes selected as the temporary cluster head.

4. The method for cluster based data transmission in wireless sensor networks according to claim 1, further comprising cancelling the temporary cluster head for at least one of the plurality of border nodes that does not sense the target for a predetermined time among one or more of the plurality of border nodes and changing the temporary cluster head to an actual cluster head of a corresponding border node.

5. The method for cluster based data transmission in wireless sensor networks according to claim 1, wherein the collecting data from each of the one or more border nodes by the temporary cluster head includes obtaining a header of the data including at least one of a node ID and cluster head information of a corresponding one of the one or more border nodes.

6. The method for cluster based data transmission in wireless sensor networks according to claim 1, wherein the aggregating the data comprises aggregating data sensed by other border nodes in other clusters with respect to the target.

7. A method for cluster based data transmission in wireless sensor networks, comprising:
   selecting one of a plurality of border nodes positioned at the edge of a cluster as a temporary cluster head based on sensing a target in the cluster; broadcasting data from the one of the plurality of border nodes selected as the temporary cluster head to its own cluster head based at least in part on the selecting;
   bugging data of the temporary cluster head by one or more of the plurality of border nodes in other adjacent clusters to form a temporary cluster including the one or more border nodes and the temporary cluster head;
   reselecting at least one of the plurality of border nodes having a highest priority among the plurality of border nodes as the temporary cluster head based at least in part on comparing priorities of the plurality of border nodes in the temporary cluster;
   collecting data from each of a portion of the border nodes by the temporary cluster head for transferring to a cluster head of the temporary cluster head; and
   aggregating the collected data by the cluster head of the temporary cluster head.

8. The method for cluster based data transmission in wireless sensor networks according to claim 7, further comprising granting priority to the cluster heads in each of clusters based at least in part on the selecting.

9. The method for cluster based data transmission in wireless sensor networks according to claim 8, wherein the granting priority is on the basis of at least one of a distance between the temporary cluster head and the portion of the border nodes collecting data, remaining energy of the temporary cluster head, and transmission capability of the temporary cluster head.

* * * * *